United States Patent [19]
Hanson et al.

[11] Patent Number: 5,943,363
[45] Date of Patent: Aug. 24, 1999

[54] DIGITAL SPREAD SPECTRUM GPS NAVIGATION RECEIVER

[75] Inventors: Peter Hanson, Fremont; Thomas Holden, Sunnyvale, both of Calif.

[73] Assignee: Stanford Telecommunications, Inc., Sunnyvale, Calif.

[21] Appl. No.: 08/682,345

[22] Filed: Jul. 17, 1996

[51] Int. Cl.$^6$ .................................................. H04K 1/00
[52] U.S. Cl. .......................... 375/206; 375/208; 370/320; 370/335; 370/342; 370/479; 342/464; 710/213
[58] Field of Search ..................................... 375/200, 206, 375/208, 209, 210; 370/320, 335, 342, 441, 479, 203, 208, 209; 342/357, 358, 457, 464; 701/213

[56] References Cited

U.S. PATENT DOCUMENTS

| | | | |
|---|---|---|---|
| 4,468,793 | 8/1984 | Johnson et al. | 375/344 |
| 4,754,280 | 6/1988 | Brown et al. | 342/357 |
| 5,192,957 | 3/1993 | Kennedy | 342/357 |
| 5,225,842 | 7/1993 | Brown et al. | 342/357 |
| 5,311,194 | 5/1994 | Brown | 342/357 |
| 5,477,195 | 12/1995 | Spilker | 331/11 |
| 5,535,237 | 7/1996 | LaPadula, III et al. | 375/200 |
| 5,654,979 | 8/1997 | Levin et al. | 375/206 |
| 5,764,687 | 6/1998 | Easton | 375/206 |

*Primary Examiner*—Amanda Le
*Attorney, Agent, or Firm*—Townsend and Townsend and Crew LLP; Henry K. Woodward

[57] ABSTRACT

Disclosed are digital processing techniques for efficiently receiving, sampling and recovering multiple direct-sequence spread-spectrum signals by multiplexing key signal processing elements across many logical channels. Global Positioning System (GPS) receivers serve to illustrate the technique. They receive many signals, each with independent timing, phase, amplitude, and data modulation, which may arrive on multiple carrier frequencies and at multiple spreading rates. To employ digital processing techniques, the carrier or carriers are reduced to one or more digital sample streams. Digital processing (e.g., products, sums, decisions, etc.) is then used to estimate, or recover, the received signal and its characteristics. When these functions can be partitioned by processing rate, the usual case, the lower-rate functions can be efficiently shared with negligible efficiency loss.

13 Claims, 6 Drawing Sheets

DIGITAL SPREAD SPECTRUM GPS NAVIGATION RECEIVER

BACKGROUND OF THE INVENTION

This invention relates generally to digital signal processing and, more particularly, the invention relates to the processing of multiple direct-sequence spread-spectrum signals such as in Global Positioning System (GPS) receivers, for example.

In a GPS navigation system, there are a plurality of GPS Satellite Vehicles (SVs) orbiting the earth. Each broadcasts a direct sequence spread spectrum signal at frequency L1. By receiving a plurality of these signals from in-view GPS satellite vehicles, very accurate location and navigation information can be determined almost anywhere on or above the earth that is visible to the GPS satellites.

GPS position solutions generally require processing at least four signals. Degraded solutions are possible with fewer signals, but the integrity, availability, accuracy, and speed of GPS positioning systems improve strongly as more signals and processing elements are added to the system. Market competition is driving high-performance GPS receivers to incorporate steadily increasing numbers and kinds of signals and signal processing elements. For example, one L1-only GPS receiver has the equivalent of 72 complex correlator channels.

The number and kind of GPS-like signals which such receivers could process is growing. GPS Svs have always transmitted similar signals at frequency L2, albeit encrypted for military use. Block IIF GPS Svs will likely provide an additional frequency for civilian use. The Russian GLONASS navigation system employs multiple carriers (1600 to 1615 Mhz). Europe is planning to establish its own analog to GPS: GNSS. The FAA is planning to establish a system of Wide Area Augmentation System (WAAS) signals via satellite, using one or more carriers at or near L1. Inmarsat and probably others are planning similar systems.

There is also a growing appreciation of the need to augment GPS from the ground using Pseudolites (PLs). Various designs have been proposed, including in-band (at or near L1) and out-of-band (away from L1) PL carriers. The FAA LAAS program, for example, contemplates adding in-band Pls at airports to improve the integrity of the GPS system. Commercial entities may provide networks of out-of-band Pls, both for integrity, and also to counter blockages near large ships, bridges, or warehouses.

Thus, it is technically preferable for GPS receivers to process all available GPS-like signals, the market is driving high-performance receivers in this direction, and there is a potential explosion in the number of GPS-like signals available for use in positioning systems. Therefore, novel techniques for efficiently receiving large number of such signals will be advantageous.

Current and previously proposed technology allow for the tracking of signals at both the L1 and L2 frequencies defined by the NAVSTAR GPS system. Extensions have been made to cover the Russian GLONASS navigation system by 3S Navigation, e.g. U.S. Pat. Nos. 5,311,194, 5,225,842 and 4,754,280.

A. J. Van Dierendonck, "Section 8: GPS Receivers", *Global Positioning System: Theory and Practice, Volume* 1; *Progress in Astronautics and Aeronautics*, Vol. 163, AIAA, 1996, provides a concise, reasonably complete discussion of modern GPS receivers. FIG. 1 shows a typical digital GPS receiver, which contains the following components: antenna 1, preamplifier 2, reference oscillator 3, frequency synthesizer 4, downconverter 5, intermediate frequency (IF) section 6, signal processing 7; and applications processing 8. All receiver components except for signal processing are typically common for all received signals.

FIG. 2 depicts a typical conventional GPS receiver, the MAGR. Here, the signal processing functions are further decomposed into sampling 11, carrier NCO 12, doppler removal 13, code NCO 14, reference code generate 15, correlation 16, sum-of product accumulation 17, and demodulation/tracking functions 18. Conventional receivers typically use a common sampler to generate a common sample stream for all signals. On the output side, the demodulation/tracking functions are typically implemented to microprocessor firmware, and thus employ common logic.

Existing GPS Receivers typically use one of three main approaches for the intermediate digital processing of multiple signals. The first is called sequencing, the second is called dedicated channel tracking, and the third is called multiplexing. Sequencing is defined by sharing one physical receiver channel to track multiple signals, one at a time, whereas the dedicated channel method uses a single channel for each signal that is tracked. Multiplexing falls in between.

Only the dedicated-channel approach is appropriate for high-performance GPS receivers. In this approach, FIG. 2 is best understood as showing a single channel of such a receiver.

FIG. 3 depicts the Stanford Telecom 9550 Triple Correlator. A conventional n-channel GPS receiver can be implemented using n of these units. Each STEL-9550 correlates its sampled inputs with the externally-supplied reference code, so n code generator functions would also be needed to generate the reference codes. The STEL-9550 processing approach differs from the conventional design in that the doppler removal is done after correlation. In normal use, decimation by a factor of 12 is provided prior to doppler removal. This enables the STEL-9550 to perform doppler removal and accumulation functions by multiplexing a single scalar multiply/accumulate unit to continuously update three complex sum-of-product accumulators. This key concept (correlate, decimate, then multiplex the rest) foreshadows the invention. The STEL-9550 however, does not take this beyond a single signal, and so it does not reduce overall complexity much, if at all, relative to the conventional approach.

SUMMARY OF THE INVENTION

The present invention can detect, track, recover, and demodulate up to n direct-sequence spread-spectrum signals, by supporting the efficient generation of k sum-of-product functions per signal, using conventional analog "front end" and analog-to-digital sampling techniques as are commonly found in GPS receivers The present invention employs a multiplex accumulator block which receives a plurality of partial sum inputs (S[1 . . . n, 1 . . . k]) which are multiplexed to a shared multiplier/rotator with the product summed with previously accumulated products for each input. The accumulated products are multiplexed and stored in a random access memory (RAM) from which they are selectively removed for application to a shared adder for accumulating the products, which are again stored in RAM. A multiplexer selectively passes to RAM, along with the accumulated products, a carrier phase estimate ($\phi i(t)$) and a frequency word ($fn(i)$).

Up to n available signals, s[i], together with whatever noise and interference components exist at the receiver, are received at an antenna, filtered, amplified, and sampled, using conventional techniques and circuits. Conventional analog frequency translation and/or digital undersampling techniques may also be used to downconvert and further amplify the received signals prior to sampling. These signals typically have a nominally identical (center) frequency except for nominally independent distortions due to doppler and clock errors. These frequency variations are typically very small—the sampling rate is typically many thousands of times greater than the worst-case frequency residual. Only nominal carrier phase is removed from the raw samples, so the sampler must provide quadrature information, preferably sequentially.

The sample sequence representing the n combined signals enter n*k front-end sum-of-product (correlator) blocks, each of which is also fed with a reference waveform, typically either punctual PN code, a PN code replica with a small advance or delay, or a related reference signal, such as the QCDLL tracking reference waveform, as defined in U.S. Pat. No. 5,477,195. The n*k sum-of-product terms are accumulated for m samples, then input to a Multiplex Accumulation block.

This block sequences through all n*k sums, removing carrier phase and accumulating sums for use in signal detection, discriminators, and demodulation. In the processing of a single signal, the carrier phase estimate of that signal is updated, using an NCO, and the associated k complex sum-of-product terms are sequentially derotated and added to their respective accumulators.

The accumulation process continues for a period of T cycles (typically 1–20 ms), at which point the resulting n*k sum-of-product outputs are output to a conventional tracking/demodulation block, which implements n code and carrier tracking loops and demodulates n BPSK data streams. The code and carrier tracking loop functions compute loop discriminators, filter them, and update the NCO frequency numbers in the multiplex accumulation block. These are accumulated in n carrier NCOs and n code NCOs to provide cycle-by-cycle estimates of carrier phase and code timing offset. Carrier phase is used to derotate the samples, as explained above. The code timing offsets are fed to n PN reference waveform generators, which in turn feed the n*k reference signals into the front-end correlator blocks, completing the code tracking loop.

This invention reduces the complexity required to implement the n*k sum-of-product calculations employed by a typical GPS receiver. It does this by efficiently multiplexing the carrier and code phase accumulation and carrier phase removal functions, and by enabling all but the earliest level of sum-of-product buffering to be moved into RAM.

The invention and objects and features thereof will be more readily apparent from the following description and appended claims when taken with the drawings.

DETAILED DESCRIPTION OF THE PREFERRED EMBODIMENT

Figure 4:
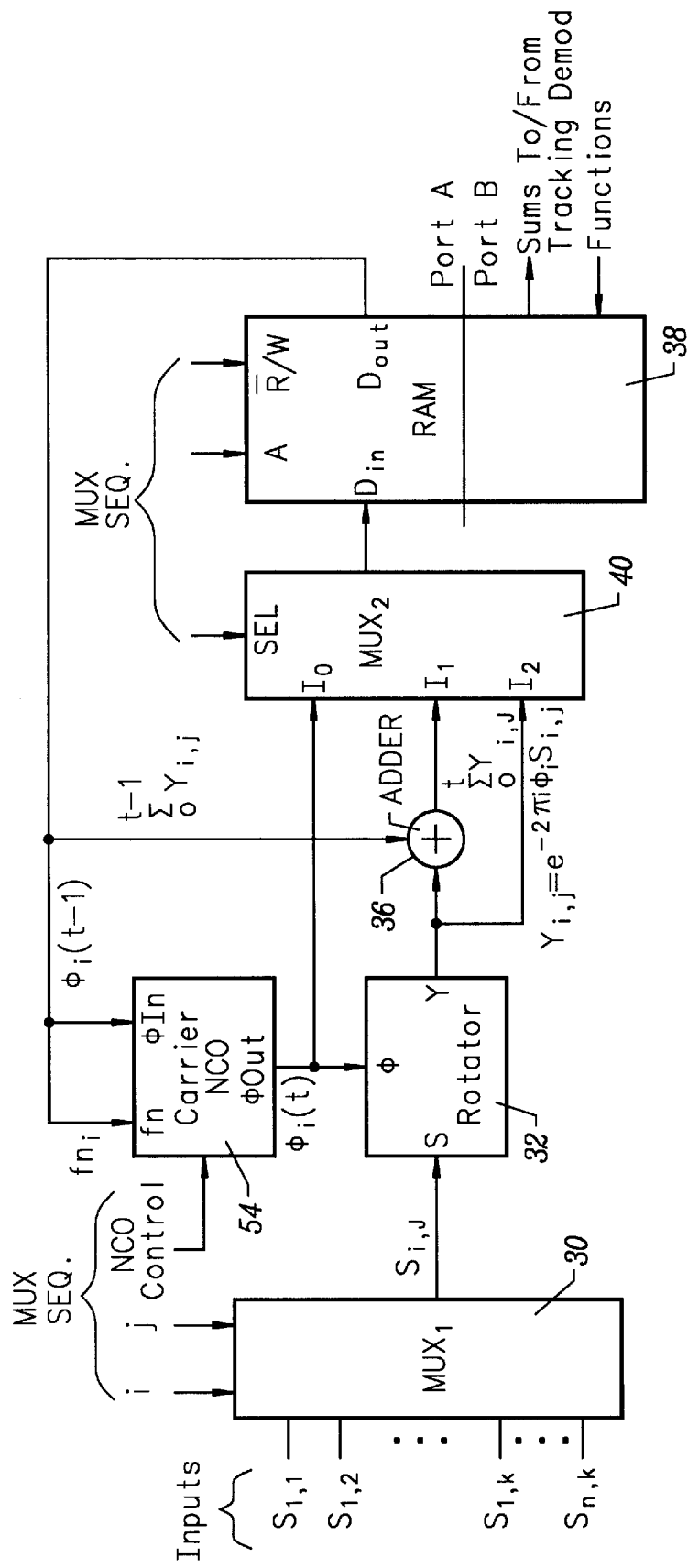
FIG. 4 is a functional block diagram of a multiplex accumulator in accordance with the invention.

FIG. 4 is a functional block diagram of a multiplex accumulator in accordance with the invention. A first multiplexer (MUX1) 30 receives a plurality of partial sum inputs which are applied sequentially to multiplier rotator 32 which receives inputs from carrier phase accumulator 34. The output of rotator 32 is applied to one input of adder 36, the other input being the accumulated products stored in RAM 38. A second multiplexer 40 selectively applies to RAM 38 the updated accumulated product for each input along with the updated carrier phase estimate and the partial sum.

More particularly, the partial sums, S[1 . . . n, 1 . . . k] are input to MUX1, which selects partial sum S[i,j] for input to the ROTATOR, which derotates it to form output Y[i,j]. The real and imaginary terms of this signal are then routed to the ADDER. At about the same time, the RAM is addressed to read the prior sum YS[i,j][t−1], into the other ADDER input, which then forms YS[i,j][t], which returns to RAM. In the form shown, a scalar ADDER is used, which updates each YS[i,j] over two cycles, one each for the real and imaginary components. This process repeats for T cycles, or until the associated signal phase is about to cross a modulation phase boundary, at which point the result is output; a new sum will begin on the next cycle for this signal. The function of the Carrier Phase Accumulator is to supply the carrier phase estimate φ[i][t] to the ROTATOR during the processing of S[i, 1 . . . k]. When MUX1 is about to switch to input signal i, its prior carrier phase estimate, φ[i][t−1], and frequency word, fn[i] are read from the RAM and routed to the ADDER, which then computes φ[i][t]=φ[i][t−1]+fn[i], which returns to RAM. The MSBs of φ[i][t] are also left in the carrier phase accumulator for use by the ROTATOR. The ADDER will generally employ Ripple-carry in order to support multi-word phase accumulation, at the cost of added RAM accesses. (32 or even 48 bits of resolution are usually desirable.) The sequential addressing of the MUX and RAM blocks and the gating of the Carrier NCO and other latches used to implement this block are controlled by a simple multiplex sequencer (MUX SEQ), which in principle consists of a counter addressing a simple ROM and/or logic array. The RAM conceptually provides two access ports (e.g., via dual-port, paged, or split-cycle RAM addressing), both to allow the YS[i,j] and φ[i] accumulations to be accessed by the tracking loop/demodulation functions, and to allow those functions to update the fn[i].

Figure 5:
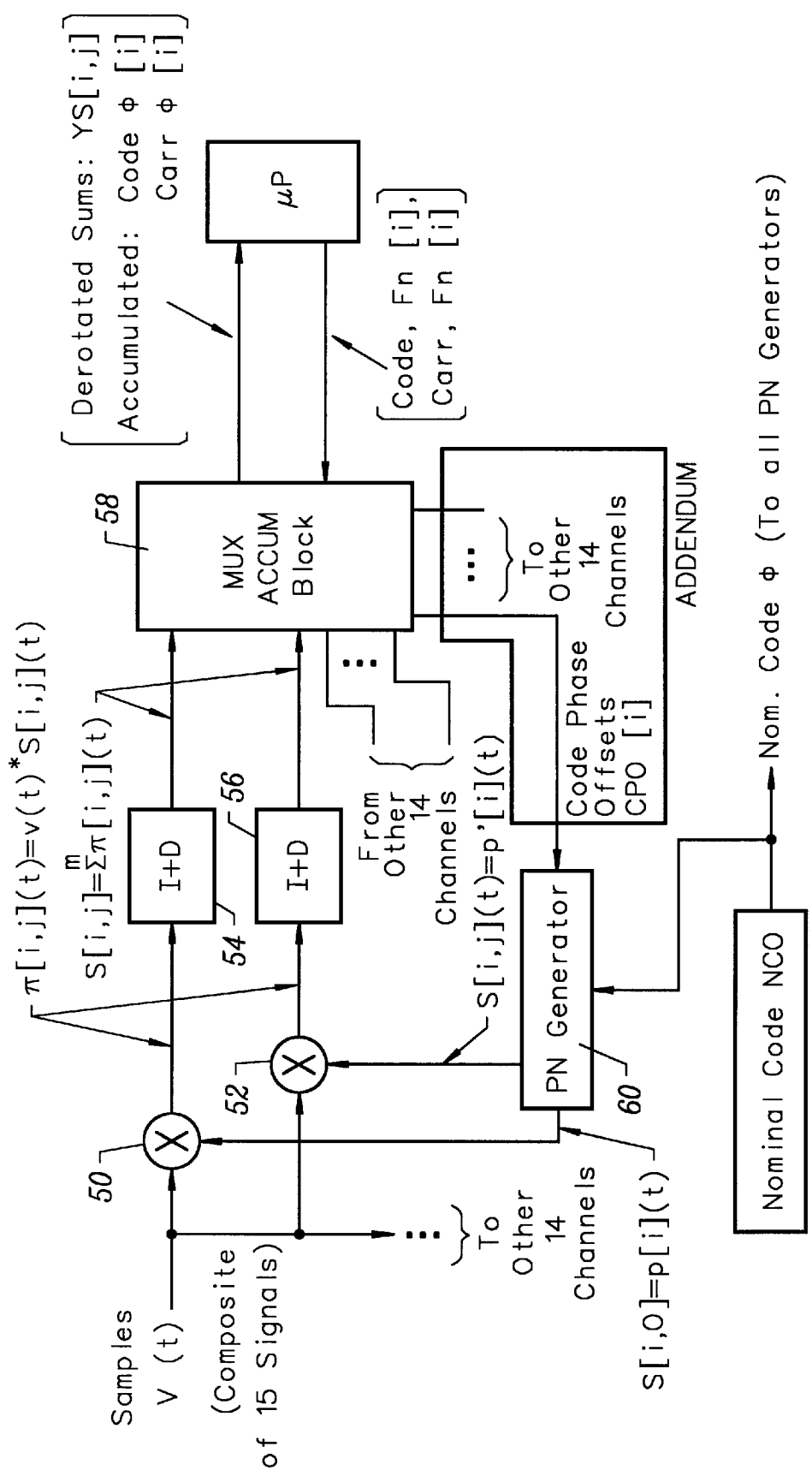
FIG. 5 is a functional block diagram of a GPS receiver including a multiplex accumulator in accordance with an embodiment of the invention.

FIG. 5 shows one channel of a 15 channel GPS C/A code receiver incorporating the invention. The input samples, v[t], are multiplied at 50, 52 by two reference sequences, Punctual PN (j=0) and the QCDLL Tracking (j=1) reference waveforms, to produce π[i,j][t]=v[t]*s[i,j][t]. As is conventional, full multiplication is not required: PN code samples are restricted to {+1,−1}; this has been extended to include zero in the case of the Tracking Reference waveform (cf. U.S. Pat. No. 5,477,195). Multiplication by such samples is trivial. Adjacent sets of m such products are accumulated by the first layer of Integrate and Dump (I+D) blocks 54,56, producing S[i,j]=Sum[π[i,j][t],{t=1 . . . m}] for input to the Multiplex Accumulator block.

Figure 1:
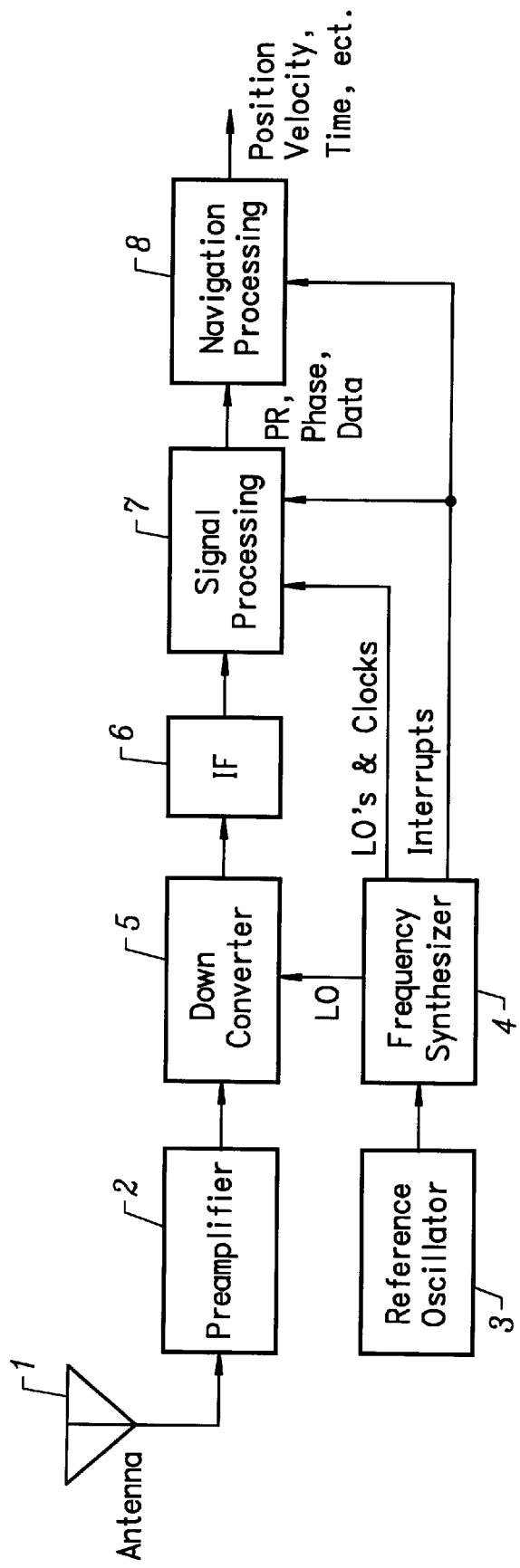
FIG. 1 is a functional block diagram of a conventional GPS receiver.
Figure 2:
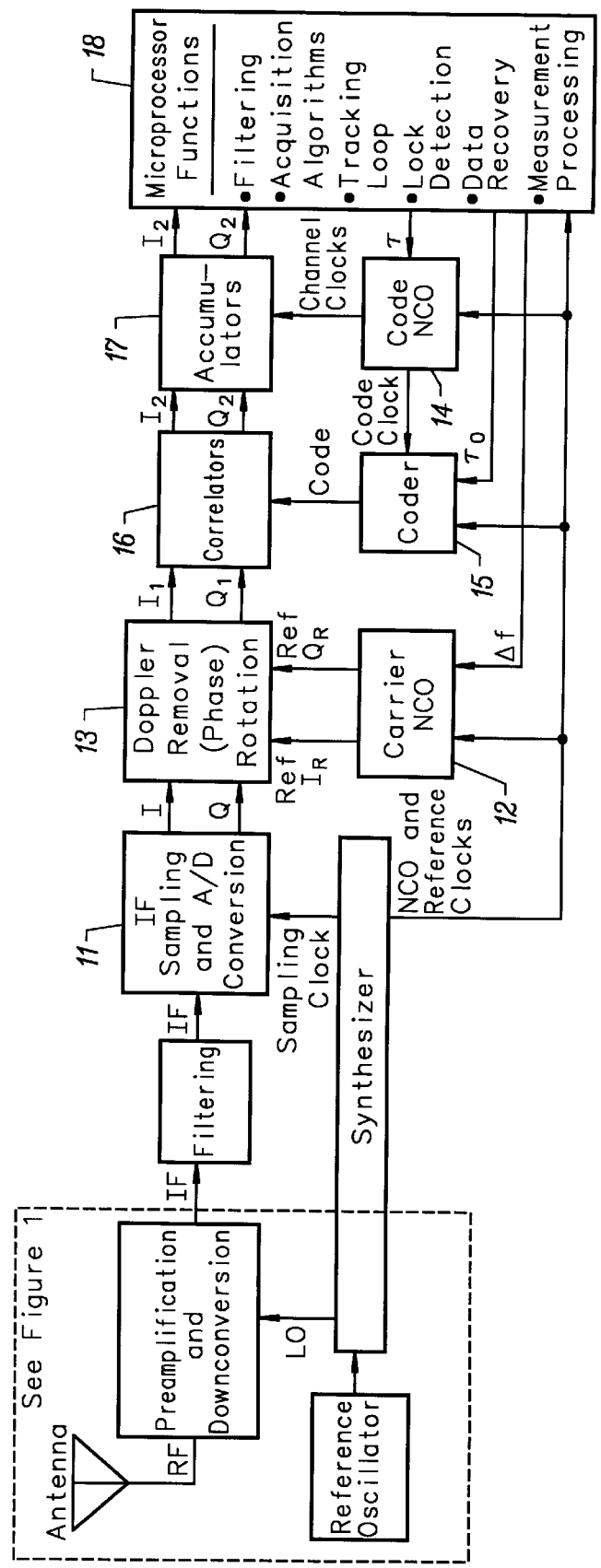
FIG. 2 is a more detailed functional bock diagram of a conventional GPS receiver.
Figure 3:
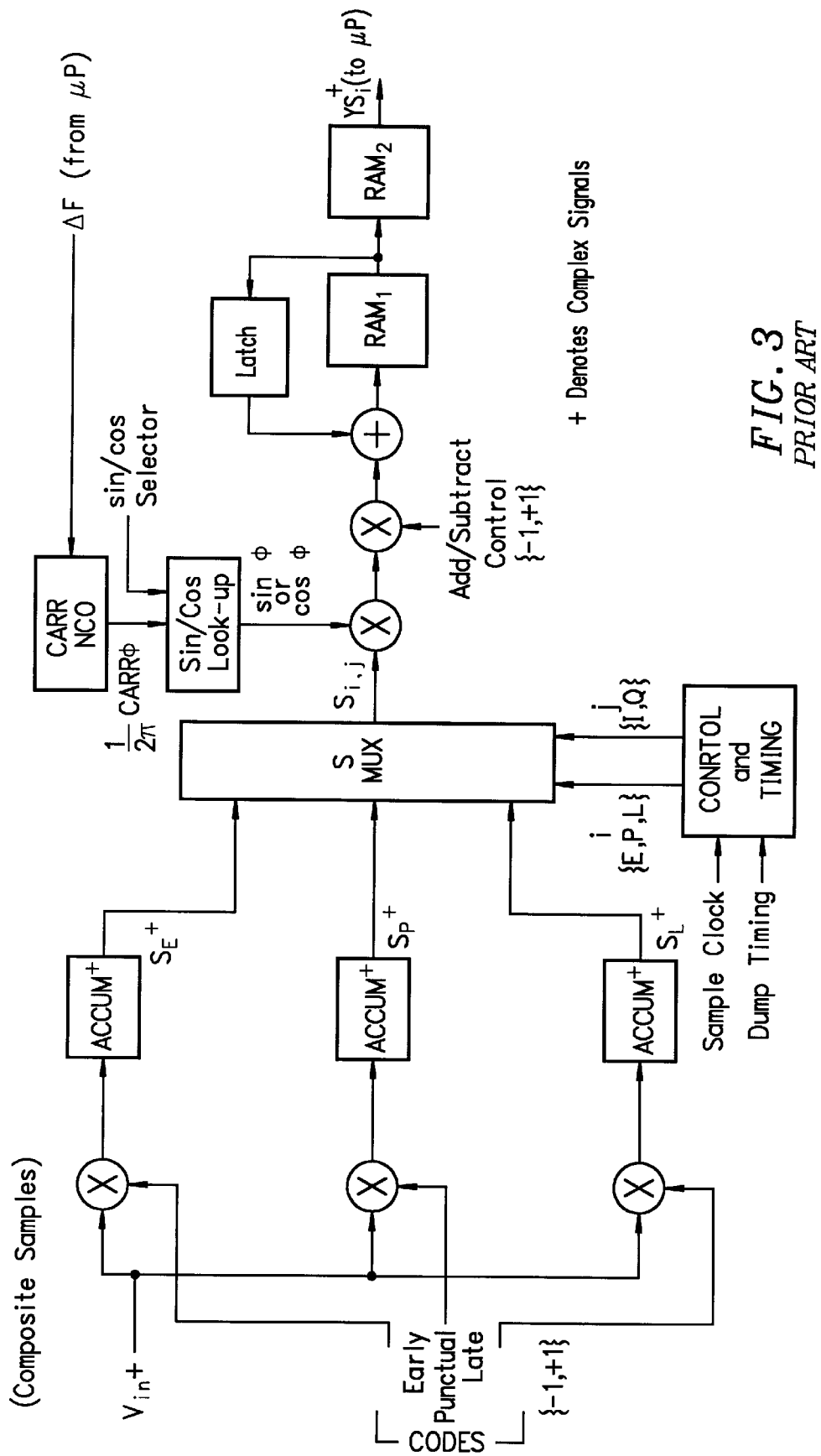
FIG. 3 is a functional block diagram of a commercially available triple correlator for use in a GPS receiver.

The invention reduces per-channel dedicated logic, and hence, overall complexity. The 15 dedicated carrier NCO and doppler removal circuits of FIG. 2 are replaced by a single MUX Accumulator 58 which provides these functions for all 15 signals. Unlike the surviving correlation multiplications, the multiplications required for doppler removal are not trivial.

The worst-case accumulation range of the dedicated I+D blocks is also modestly reduced in this design. The dedicated I+D blocks operate over only 1 percent of the nominal product accumulation time; the MUX Accumulator handles longer-term accumulation, which can result in up to 7 extra bits per sum.

In this application, the Multiplex Accumulator Block also produces a code phase offset for each signal (code $\phi[i]$), which is combined with the code phase produced by a single, shared Nominal Code NCO on a cycle-by-cycle basis in the associated PN generator block 60, and used to generate the desired reference waveforms with very fine average timebase resolution. Generally, only a few MSBs need be combined in this fashion. This reduces the complexity of the reference waveform timebase generation logic dedicated to each channel: a full NCO is replaced with a small adder, each with associated latches.

Altogether, these changes reduce per-channel dedicated logic complexity by about a factor of 3 compared to the conventional approach, assuming C/A code and 32-bit NCOs are used.

The underlying PN code generator logic, i.e., shift registers, feed-back logic, look-up tables, pause/short-cycle logic, etc., are still dedicated to each signal. The invention does not simplify this function, so as it becomes more complex, e.g., for combined C/A and P Code receivers, the complexity reduction of the dedicated channel logic, although constant in absolute terms, becomes relatively smaller.

Figure 6:
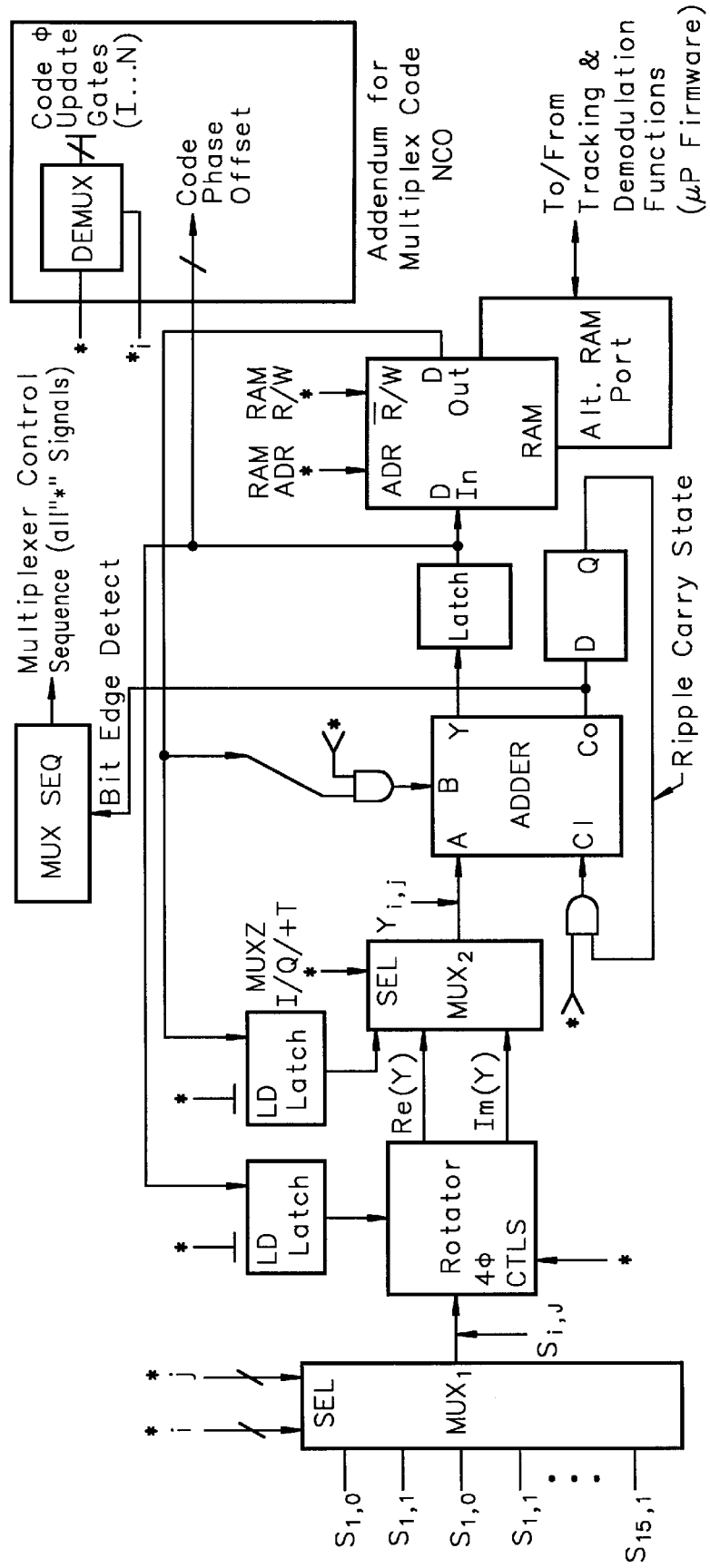
FIG. 6 is a functional block diagram of a multiplex accumulator for a 15 channel receiver in accordance with an embodiment of the invention.

FIG. 6 is a functional block diagram for a MUX accumulator for a 15 channel GPS receiver incorporating this invention. This block updates signal states and product sums according to Table 1. The accumulated YS[i,j], code $\phi[i]$, and carr$\phi[i]$ are stored in RAM for access by the demodulation/tracking loop functions, which place the codeFn[i] and carrFn[i] in RAM for access here. CodeFn[i] and carrFn[i] are the frequency numbers of the multiplex code and carrier NCOs, respectively. The DR$\phi$ column shows derotation as fully pipelined over four cycles. However, if implemented via complex multiplication, the components are best produced serially. Derotation then occurs two cycles later than shown, to more closely interleave it with accumulation.

TABLE 1

MUX Accumulation Sequence

| Cycle | RAM Access Description | Latches | Adder | DR$\phi$ | j |
|---|---|---|---|---|---|
| 20i + 0 | Read carrFN[i].LSW | T | | | |
| 1 | Read carr$\phi$[i].LSW | | MEM+T | | |
| 2 | Write carr$\phi$[i].LSW | W | | | |
| 3 | Read carrFN[i].MSW | T | | | |
| 4 | Read carr$\phi$[i].MSW | | MEM+T | | |
| 5 | Write carr$\phi$[i].MSW | WP | | | |
| 6 | Read codeFn[i].LSW | T | | | |
| 7 | Read code$\phi$[i].LSW | | MEM+T | | |
| 8 | Write code$\phi$[i].LSW | W | | | 0 |
| 9 | Read codeFn[i].MSW | T | | 0 | 0 |
| 10 | Read code$\phi$[i].MSW | | MEM+T | 1 | |
| 11 | Write code$\phi$[i].MSW | WC | | 2 | |
| 12 | Read YS[i, PUNCTUAL].I | | | 3 | |
| 13 | Write YS[i, PUNCTUAL].I | W | | 0 | |

TABLE 1-continued

MUX Accumulation Sequence

| Cycle | RAM Access Description | Latches | Adder | DR$\phi$ | j |
|---|---|---|---|---|---|
| 14 | Read YS[i, PUNCTUAL].Q | | | 1 | |
| 15 | Write YS[i, PUNCTUAL].Q | W | | 2 | |
| 16 | Read YS[i, TRACKING].I | | MEM+DRI | 3 | |
| 17 | Write YS[i, TRACKING].I | W | | | |
| 18 | Read YS[i, TRACKING].Q | | MEM+DRQ | | |
| 19 | Write YS[i, TRACKING].Q | W | | | |

Table 2 is a demodulation/tracking functions summary. This table is provided to illustrate how the demodulation/tracking functions update separate carrFn[i] and codeFn[i] in order to control reference carrier and code phase motion. Tables 2a and 2b describe conventional data demodulation with a carrier PLL, Tables 2c and 2d describe a conventional 2nd order carrier PLL, Table 2e lists QCDLL discriminator processing equations, and Table 2f describes a 1st-order code tracking loop using the QCDLL discriminator with full carrier-aiding. For clarity, these functions are shown as though floating-point arithmetic was used. (This is rarely the case, but conventional fixed-point scaling depends closely on other details and requirements, and is harder to follow.)

TABLE 2

Demodulation/Tracking Functions

Table 2a. Demodulation:

$bit[i] = 0$ if $YS[i, PUNCTUAL] \cdot I \leq 0$, else 1

Table 2b. Amplitude:

$A2P = YS[i, PUNCTUAL] \cdot I^2 + YS[i, PUNCTUAL] \cdot Q^2$

Table 2c. Carrier PLL (2nd Order):

$$carrFn[i] \mathrel{+}= G_{PLL} * \frac{YS[i, PUNCTUAL] \cdot Q}{SQRT(A2P)} * BPSK(bit[i])$$

$G_{PLL}$ is the PLL Loop gain constant, including NCO scaling.

$BPSK(z)$ is $\{-1, +1\}$ when $z$ is $\{0, 1\}$, respectively.

Table 2d. Carrier-Aiding of Code Timebase:

$codeFnNOM[i] = a0 + a1 * carrFn[i]$ $a1$ is due to frequency and NCO scaling differences;

$a0$ reflects down-conversion offsets.

Table 2e. QCDLL Discriminator:

$De = YS[i, PUNCTUAL] \cdot I * YS[i, TRACKING] \cdot I +$
$\quad YS[i, PUNCTUAL] \cdot Q * YS[i, TRACKING] \cdot Q$ Table 2f. QCDLL Code Tracking:

$$codeFn[i] = G_{DLL} * \frac{De}{SQRT(A2P)} + codeFnNOM[i]$$

The processing listed in Table 2 assumes that the YS[i,j] have already been accumulated over an entire bit period. However, the MUX accumulator processing shown accumulates samples for only 1 ms, regardless of the actual data rate. To handle conventional GPS signals with 50 b/s data, the demodulation/tracking function must first accumulate the 20 YS[i,j] values over each bit, then implement the equations of Table 2 using those sums.

GPS signals use BPSK data modulation. Normally, the receiver has no prior knowledge of the bit stream being demodulated, resulting in the traditional BPSK ambiguity: each correlation over a data bit may or may not be inverted due to BPSK modulation of a presently unknown data bit. At bit edges, there may or may not be a transition. If there is, a correlation sum accumulated across the bit edge will degrade accordingly—possibly all the way to zero. Conventional practice is to dump each correlation sum at bit edges (or T times per bit, starting at the edge) as identified by the code timebase of the associated reference waveform generator.

Perhaps the most obvious implication of this that the MUX Sequencer should consider the code phase when it generates the dump pattern, to allow each dump point to move with the expected bit edges of the associated signal. Dumping and accumulation can be implemented with same cycle count, allowing them to be intermixed in any pattern. This level of control is quantized to steps of m samples. The expected loss is 20 log (1−rho), where rho is the ratio of this step size to the actual bit period; i.e., the final dump/accumulate rate ratio.

It is possible to reduce bit-edge losses further, but it requires more complexity and is rarely justified. Actual fast accumulation could be performed over m,+/− one fast sample (or sample set) each time, to come as close as possible to the bit edge. This will require the MUX Sequencer to consider code phase when scheduling the signal updates, i.e., to dynamically reorder sum-of-product accumulation. The MUX Accumulation block could also provide controls to the fast accumulators to effect the variation of m. The MUX Sequencing schedule would also need slight excess capacity in order to handle the case when all channels are tracking with reduced m values (i.e., the worst case positive doppler over all channels).

In any case, efficient resolution of the bit edge problem fundamentally implies that the inputs to the demodulation/tracking functions do not arrive synchronously, but instead track the actual variations in bit-edge time of the affected signals. However, signal state updates and sampling can be synchronous, which is preferable.

This invention reduces the complexity required to implement the n*k sum-of-product calculations employed by a typical GPS receiver. It does this by efficiently multiplexing the carrier and code phase accumulation and carrier phase removal functions, and by enabling all but the earliest level of sum-of-product buffering to be moved into RAM.

Assume m is at least n*(k*a1*b+a0*b). Then the cycle time at the multiplex accumulation block can be b times longer than the nominal sample period, and it can spend a0 multiplex cycles updating each signal state and a1 multiplex cycles updating each sum-of-products. The stated inequality ensures that there is time to add all samples to all sums, leading to insignificant processing losses. Thus, the processing loss of conventional multiplex receivers is avoided.

Generally b will be set to a value that permits one RAM read or write per multiplex cycle to enable all multiplex accumulators and signal state information to reside in RAM. This will amount to over 2K bits of data for a conventional 16 channel GPS receiver. It is far preferable to implement such large amounts of storage via RAM as opposed to distributed in registers associated with each sum.

Conventional digital carrier processing employs a full separate carrier NCO (or equivalent) for each of the n signals; this invention replaces these with a shared carrier NCO, reducing carrier processing complexity by a factor of 1/n.

Conventional digital code processing employs a full separate code NCO (or equivalent) and reference (PN) generator for each of the n signals. The digital reference code generators use the resulting fractional phase sequences to implement very fine average timebase resolution. This invention describes how to replace these n full NCOs with two full NCOs—one generating the nominal code phase ramp on a sample-by-sample basis, and a shared code offset NCO—plus a small sample-by-sample adder to combine the two for each signal. Negligible degradation results because the update rate of the code offsets is the same as that for carrier phase, and CDMA spreading bandwidth is generally a small fraction of the carrier frequency. This aspect of the invention effectively reduces code timebase generation complexity by a factor of about ¼ for large n. For modest n, the relatively higher fixed overhead of the second NCO and the extra adders reduce the benefit and the conventional code generation approach may be preferred.

In more complex systems, the various received signals may not use exactly identical coding and data modulation rates. Consider, for example, a GPS receiver which processes both C/A and P code modulation. The P Code edge rate is ten times that of C/A code. However, both are modulated with Navigation Data at the same 50 bps rate and using the same modulation and framing rules. These variations need not affect the MUX Accumulation process. Nominal edge rate is really a reference waveform issue, and reference generation is already separate for each signal.

Consider also the WAAS signal, which uses C/A codes from the same family at the same edge rate as conventional GPS, but uses a data modulation rate that is ten times higher. Prototype WAAS receivers have nominally supported 5, 10 and 20 times the GPS data rate. The point of WAAS is to augment GPS, so the receiver must also be capable of tracking conventional GPS signals; it must deal with the bit edge effects of both kinds of signals as outlined above. Variations over this kind of a family of rates can be ignored at the MUX Accumulator by handing accumulations over to the demodulation/tracking functions at the highest rate of such a family: 1 kHz, in this case.

If this places an unacceptable burden on the demodulation/tracking functions, or if the needed data rates are not so nicely related, the MUX Accumulator block can be extended to support more than one dump pattern. This increases sequencer complexity, but not unduly: dumping can be implemented with same cycle count as accumulation, allowing them to be intermixed in any pattern.

In many systems, signals may be received on two, three, or more nominal frequencies. In such cases, the available options will hinge upon frequency planning details, relative noise and power levels, and whether codes can be reused on different frequencies. The conventional and most general approach is to employ a separate sampler for each frequency.

Consider an L1-L2 GPS receiver. Two samplers are used, each producing a separate sample sequence for a single frequency. This approach, or one like it, is necessary because the L1 and L2 signals of interest are received in pairs, both from the same SV, and both having exactly the same code and modulation sequences.

Conceptually, the simplest design is to use one receiver channel for each input signal. This approach requires n channels to receive both the L1 and L2 signals from n/2 SVs. If two samplers are used, with the same sample clock, then the receiver can use a switch at the input of each channel and so use any channel for any frequency. On FIG. 4, half of the S[i,*] inputs would represent L1 correlations; the other half would represent L2.

The demodulation/tracking functions will generally operate differently on the L1 and L2 inputs.

Modern L1-L2 receivers commonly use dedicated logic to reduce overall complexity. They exploit the fact that only minor differences are expected between the L1 and L2 signals. Several techniques are available which reuse the information generated in order to correlate each L1 signal, for the purpose of tracking the corresponding L2 signal, e.g., using delays of the L1 code, L1-L2 cross-correlation, or other techniques. Similarly, the MUX Accumulator could be designed to treat the L1 and L2 correlations together; i.e., design it with n as the number of SVs, and with k=k1+k2 inputs for each one (k1 for L1, and k2 for L2—they need not be the same). this would reuse at least part of the L1 signal states for the L2 signals at the MUX Accumulator too. This isn't practical for carrier states but may be for code states. For example, the doppler effect is very different as seen at the L1 and L2 carriers, as are the effects of reference frequency errors.

Consider a two-frequency GPS receiver which augments GPS with Out-of-band Psuedolite signals on at least one extra nominal frequency, as in U.S. Pat. No. 5,311,194. Unique PN codes and modulation patterns are used on all signals regardless of frequency. As before, multiple samplers can be used with a switch at the input to each channel. Alternatively, as discussed in, for example, U.S. Pat. No. 5,477,195, clever amplification and frequency plans can sometimes be used to mix two or more frequencies together at the input to a single sampler. The resulting single sample stream will then contain all n signals just as through they were formed within in a single-frequency CDMA system. The unique spreading codes will enable the receiver to receive them separately.

Either approach would look the same t the MUX Accumulator: any of the S[i,j] inputs would represent correlations from any of the signal frequencies.

Again, the demodulation/tracking functions will generally operate differently on signals with different nominal carrier frequencies.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

We claim:

1. For use in a CDMA receiver in which spread spectrum signals are correlated with a plurality of known reference codes to recover a plurality of (k) sum-of-product observations of each of a plurality of (n) said signals, the relative carrier phase offsets and motion of said signals being nominally independent from signal to signal, a multiplex accumulator comprising:

phase estimating means for sequentially developing a plurality of carrier phase offset estimates, $\phi[i](t)$, one for each of said plurality of (n) signals, said phase estimating means including memory for storage of carrier phase estimates, $\phi i$, and carrier frequency numbers, Code Fni, for said signals, and means for carrier phase accumulation by receiving carrier phase estimate, $\phi i(t-1)$, and carrier frequency number, Code Fni, from said memory and summing them to produce an updated carrier phase estimate, $\phi i(t)$, for return to said memory for further accumulation and later retrieval, a mechanism for receiving a plurality of (k) complex partial sum of product inputs for each of a plurality of (n) signals, S(1 ... n, 1 ... k), wherein all inputs for any one signal are nominally measured relative to said carrier phase offset estimate, and sequentially selecting exactly one of said inputs, S(i,j), rotator means for sequentially receiving and rotating said selected input, S(i,j) to provide a complex product, Y(i,j), in which said carrier phase offset estimate, $\phi(i)$ (t) is removed, an adder for receiving and summing said product, Y(i,j), with a previous accumulation of complex sum-of-products from said adder, YS(i,j) (t−1), to produce an updated sum-of-products, YS(i,j), and a memory for storing the accumulated sums-of-products, YS(i,j), from said adder for further accumulation and later retrieval, wherein said phase estimating means sequentially reuses the adder and memory functions used for sum-of-product accumulation.

2. The multiplex accumulator as defined by claim 1, wherein the real and imaginary parts of said complex inputs, S(i,j), are processed sequentially by said rotator means, and wherein scalar multiplication, addition, and memory operations are used to sequentially produce the real and imaginary parts of the rotated input, Y(i,j), and the accumulated sums-of-products, YS(i,j) (t).

3. The multiplex accumulator as defined by claim 1, wherein the phase estimating means also produces code phase offset estimates, code $\Phi i(t)$, for use in reference waveform generation by further comprising:

memory for storage of code phase estimates, code $\Phi i$, and code frequency numbers, Fni, for said signal, means for code phase accumulation by receiving code phase estimate, code $\Phi i(t-1)$, and code frequency number, Fni, from said memory and summing them to produce an updated code phase estimate, code $\Phi i(t)$, for return to said memory for further accumulation and later retrieval, and means for distributing said code phase offsets, code $\Phi i(t)$, for use in reference waveform generation.

4. The multiplex accumulator as defined by claim 1 wherein said mechanism includes a first multiplexer for receiving said plurality of input signals, S(1 ... n, 1 ... k) and sequentially providing said input signals as an output signal.

5. For use in a CDMA receiver in which spread spectrum signals are correlated with a plurality of known reference codes to recover a plurality of (k) sum-of-product observations of each of a plurality of (n) said signals, the relative carrier phase offsets and motion of said signals being nominally independent from signal to signal, a multiplex accumulator comprising:

phase estimating means for sequentially developing a plurality of carrier phase offset estimates, $\phi(i)$ (t), one for each of said plurality of (n) signals, a mechanism for receiving a plurality of (k) complex partial sum of product inputs for each of a plurality of (n) signals, S(1 ... n, 1 ... k), wherein all inputs for any one signal are nominally measured relative to said carrier phase offset estimate, and sequentially selecting exactly one of said inputs, S(i,j), rotator means for sequentially receiving and rotating said selected input, S(i,j) to provide a complex product, Y(i,j), in which said carrier phase offset estimate, $\phi(i)$ (t) is removed, an adder for receiving and summing said product, Y(i,j), with a previous accumulation of complex sum-of-products from said adder, YS(i,j) (t−1), to produce an updated sum-of-products, YS(i,j), a memory for storing the accumulated sums-of-products, YS[i,j], from said adder for further accumulation and later retrieval, and a multiplexer for sequentially applying sums of products from said adder to said memory.

6. The multiplex accumulator as defined by claim 5 wherein said multiplexer comprises a part of said memory.

7. A receiver for a plurality of (n) spread spectrum signals, wherein the relative carrier phase offsets and motion of said signals are nominally independent from signal to signal, comprising:

an antenna for receiving said spread spectrum signals, means for filtering and amplifying said spread spectrum signals and producing a plurality of (k) complex partial sum of product observation inputs for each of a plurality of (n) said signals, S(1 . . . n, 1 . . . k), wherein non-negligible residual relative carrier phase offsets and motion may be retained in said inputs, phase estimating means for sequentially developing a plurality of (n) estimates of said residual carrier phase offset, $\phi(i)$ (t), one for each of said plurality of (n) signals, said phase estimating means including memory for storage of carrier phase estimates, $\phi i$, and carrier frequency numbers, Fni, for each signal, and a means for carrier phase accumulation by receiving carrier phase estimate, $\phi i(t-1)$, and carrier frequency number, Fni, from said memory and summing them to produce an updated carrier phase estimate, $\phi i(t)$, for return to said memory for further accumulation and later retrieval, a mechanism for receiving said signals, S(1 . . . n, 1 . . . k), and sequentially selecting exactly one, S(i,j), a rotator means for sequentially receiving and rotating said selected input, S(i,j), to provide a complex product, Y(i,j), in which said carrier phase offset, $\phi(i)$ (t), is removed, an adder for receiving and summing said product, Y(i,j), with a previous accumulation of complex sum-of-products from said adder, YS(i,j)(t−1), to produce an updated sum-of-products, YS(i,j) (t), and memory for storing the accumulated sums-of-products, YS(i,j), from said adder for further accumulation and later retrieval, wherein said phase estimating means sequentially reuses the adder and memory functions used for sum-of-product accumulation.

8. The receiver as defined by claim 7, wherein the real and imaginary parts of said complex partial product observations, S(i,j), are processed sequentially by said rotator means, and wherein scalar multiplication, addition, and memory operations are used to sequentially produce the real and imaginary parts of the rotated input, Y(i,j), and the accumulated sums-of-products, YS(i,j) (t).

9. The receiver as defined by claim 7, wherein the phase estimating means also produces code phase offset estimates, code $\Phi i(t)$, for use in reference waveform generation by further comprising:

memory for storage of code phase estimates, code $\Phi i$, and code frequency numbers, code Fni, for said signal, and means for code phase accumulation by receiving code phase estimate, code $\Phi i(t-1)$, and code frequency number, code Fni, from said memory and summing them to produce an updated code phase estimate, code $\Phi i(t)$, for return to said memory for further accumulation and later retrieval, and means for distributing said code phase offsets, code $\Phi i(t)$, for use in reference waveform generation.

10. The receiver a defined by claim 7 and wherein said mechanism includes a first multiplexer for receiving said plurality of input signals, S[1 . . . n, 1 . . . k] and sequentially providing said input signals as an output signal.

11. A receiver for a plurality of (n) spread spectrum signals, wherein the relative carrier phase offsets and motion of said signals are nominally independent from signal to signal, comprising:

an antenna for receiving said spread spectrum signals, means for filtering and amplifying said spread spectrum signals and producing a plurality of (k) complex partial sum of product observation inputs for each of a plurality of (n) said signals, S(1 . . . n, 1 . . . k), wherein non-negligible residual relative carrier phase offsets and motion may be retained in said inputs, phase estimating means for sequentially developing a plurality of (n) estimates of said residual carrier phase offset, $\phi(i)$ (t), one for each of said plurality of (n) signals, a mechanism for receiving said signals, S(1 . . . n, 1 . . . k), and sequentially selecting exactly one, S(i,j), a rotator means for sequentially receiving and rotating said selected input, S(i,j), to provide a complex product, Y(i,j), in which said carrier phase offset, $\phi(i)$ (t), is removed, an adder for receiving and summing said product, Y(i,j), with a previous accumulation of complex sum-of-products from said adder, YS(i,j) (t−1), to produce an updated sum-of-products, YS(i,j) (t), memory for storing the accumulated sums-of-products, YS(i,j), from said adder for further accumulation and later retrieval, and a multiplexer for sequentially applying sums of products from said adder to said memory.

12. The receiver as defined by claim 11 wherein said multiplexer comprises a part of said memory.

13. The receiver as defined by claim 11, wherein (k) complex inputs for each of said plurality of (n) signals comprise partial correlation sums formed with respect to two real-valued QCDLL reference codes, without provision for prior estimation and removal of relative carrier phase offsets and motion to negligible levels.

* * * * *